(12) United States Patent
Tsai

(10) Patent No.: US 10,146,067 B2
(45) Date of Patent: Dec. 4, 2018

(54) EYE-PROTECTIVE SHADE FOR AUGMENTED REALITY SMART GLASSES

(71) Applicant: Ching-Lai Tsai, New Taipei (TW)

(72) Inventor: Ching-Lai Tsai, New Taipei (TW)

(73) Assignee: Ching-Lai Tsai, New Taipei (TW)

( * ) Notice: Subject to any disclaimer, the term of this patent is extended or adjusted under 35 U.S.C. 154(b) by 0 days.

(21) Appl. No.: 15/261,219

(22) Filed: Sep. 9, 2016

(65) Prior Publication Data

US 2018/0074346 A1    Mar. 15, 2018

(51) Int. Cl.
| | |
|---|---|
| *G02C 9/00* | (2006.01) |
| *G02B 27/14* | (2006.01) |
| *G02C 7/10* | (2006.01) |
| *G02B 27/01* | (2006.01) |
| *G02C 7/16* | (2006.01) |

(52) U.S. Cl.
CPC ........... *G02C 7/10* (2013.01); *G02B 27/0172* (2013.01); *G02C 7/16* (2013.01); *G02C 9/00* (2013.01); *G02B 2027/0118* (2013.01); *G02B 2027/0141* (2013.01); *G02B 2027/0178* (2013.01); *G02C 2200/08* (2013.01)

(58) Field of Classification Search
CPC ... G02C 7/10; G02C 7/16; G02C 9/00; G02C 2200/08; G02B 27/0172; G02B 2027/0141; G02B 2027/0178
USPC .............. 351/41, 44, 47; 359/630, 629, 618; 345/7
See application file for complete search history.

(56) References Cited

U.S. PATENT DOCUMENTS

| | | | |
|---|---|---|---|
| 4,636,866 A | 1/1987 | Hattori | |
| 8,537,075 B2* | 9/2013 | Crocco | G09G 5/00 345/7 |
| 2012/0068913 A1 | 3/2012 | Bar-Zeev et al. | |
| 2012/0326948 A1* | 12/2012 | Crocco | G09G 5/00 345/7 |
| 2015/0091789 A1* | 4/2015 | Alzate | G02B 27/0172 345/156 |
| 2016/0187654 A1 | 6/2016 | Border et al. | |

FOREIGN PATENT DOCUMENTS

| | | |
|---|---|---|
| CN | 104777613 A | 7/2015 |
| CN | 105492957 A | 4/2016 |
| DE | 3345458 A1 | 6/1984 |
| TW | 200817754 A | 4/2008 |
| TW | 201443510 A | 11/2014 |

* cited by examiner

*Primary Examiner* — Tuyen Tra
(74) *Attorney, Agent, or Firm* — Chieh-Mei Wang

(57) ABSTRACT

An eye-protective shade for the AR (Augmented Reality) smart glasses is provided, including: an eye protection unit disposed in front of the AR smart glasses, wherein the eye protection unit is disposed with a pair of shading portions capable of filtering light, and the pair of the shading portions respectively correspond to a pair of semitransparent display portions disposed on the AR smart glasses, and the pair of shading portions are made of translucent material and/or opaque material; when reading digital information by use of the eye-protective shade along with the AR smart glasses, the eye-protective shade protects the user's eyeballs and the macula from direct light radiation while the peripheral retina is continuously in contact with external light sources. The present disclosure can change the user's reading habits and moderate visual fatigue when reading.

5 Claims, 9 Drawing Sheets

EYE-PROTECTIVE SHADE FOR AUGMENTED REALITY SMART GLASSES

BACKGROUND

1. Technical Field

The present disclosure relates to an eye-protective shade for AR (Augmented Reality) smart glasses; in particular, it relates to an eye protection unit disposed in front of AR smart glasses which is used to improve human reading habits and thus to solve the long-standing problem of human eye fatigue in close reading and deterioration of myopia.

2. Description of Related Art

It is generally believed by the ophthalmological community that prolonged periods of reading and writing and insufficient outdoor activities are main factors that cause visual fatigue and deterioration of myopia. When spending too much time indoors watching TV, reading, surfing the internet, and so on, the following four major causes may result in visual fatigue and deterioration of myopia: (1) prolonged ciliary muscle contraction, (2) prolonged convergence, (3) insufficient contact time with sunlight and (4) relative peripheral hyperopia.

In an uncorrected myopic eye, the image of a distant object comes to a focal point in front of the central retina, but behind the peripheral retina. The eye is centrally nearsighted, but actually farsighted at the peripheral retina. This relative peripheral hyperopia (RPH) could stimulate the deterioration of myopia. Conventional myopic eyeglasses only correct the central myopia but do not correct the relative peripheral hyperopia. When light focuses behind the retina, the eye's axial length increases to enable the light to focus on the surface of the retina, which causes deterioration of myopia.

When reading, using a cellphone, or watching TV, the eyeballs actively search the target screen. Once the distance between the eyeballs and the target screen is less than six meters, the ciliary muscle has to contract to adapt to the distance. The ciliary muscle contraction leads to visual fatigue and easily causes deterioration of myopia.

When reading or using electronic products, there is only one target screen. When reading in such a manner the eyeballs have to converge, that is, by the contraction of the medial rectus muscle. However, the contraction of the medial rectus muscle may cause high intraocular pressure, and the high intraocular pressure may cause elongation of the posterior segment of the eyeballs. Thus the growth of the anteroposterior diameter of the eyeballs results in myopia deterioration.

Australian clinical studies report that too little time for outdoor activities during the day and insufficient contact time with sunlight may gradually lead to deterioration of myopia.

As shown in FIG. 10, people like to read or use electronic products with their heads down, which may cause neck stiffness and shoulder soreness.

People like to read in a sitting posture with their heads down for prolonged periods; it is well-known that such a reading habit easily causes cardiovascular diseases and weakness of muscles, bones, joints, and so on.

When reading or using electronic products indoors or outdoors, visual fatigue occurs easily because the reading material or screens of the electronic products may make eyes suffer from stray light and/or reflected light.

When reading or using electronic products on a vehicle, such as an automobile or an airplane, the target screen is affected by the vehicle vibration, causing reading difficulty, visual fatigue, and dizziness.

In recent decades, there have been various training methods and equipment used to improve vision. For example, electronic imaging technology which can train the patient's ciliary muscle and an instrument which prompts the patient's eyeballs to focus on near and distant objects alternately, also to train the ciliary muscle. However, prevalent disadvantages of these conventional training methods and therapeutic instruments include complex structure, ineffectiveness, long and boring process of treatment, and so on. To lively young people and busy people, it is difficult to implement these training methods and equipment effectively.

In view of this, the present disclosure provides an eye-protective shade for AR (Augmented Reality) smart glasses which, when used in conjunction with said smart glasses, aims at effectively improving the shortcomings mentioned above.

SUMMARY

The primary purpose of the present disclosure is to provide an eye-protective shade for AR (Augmented Reality) smart glasses, comprising: an eye protection unit disposed in front of the AR smart glasses, wherein the eye protection unit is disposed with a pair of shading portions capable of filtering light, and the pair of the shading portions respectively correspond to a pair of semitransparent display portions disposed on the AR smart glasses, and the pair of shading portions are made of translucent material and/or opaque material; when reading digital information by use of the eye-protective shade along with the AR smart glasses, the eye-protective shade protects the user's eyeballs and the macula from direct light radiation while the peripheral retina is continuously in contact with external light sources.

According to one exemplary embodiment of the present disclosure, an area of each of the pair of shading portions is disposed with a convex lens.

According to one exemplary embodiment of the present disclosure, an area of each of the pair of shading portions is disposed with a plane lens.

According to one exemplary embodiment of the present disclosure, the AR smart glasses comprise a host used to transmit data and a frame unit on which the pair of semitransparent display portions are disposed.

According to one exemplary embodiment of the present disclosure, the host includes a reading system installed with teaching material selected from a group comprising language, science, math, geography, history, physics, chemistry, art, and music.

According to one exemplary embodiment of the present disclosure, the eye protection unit is formed as an independent set of lenses detachably disposed in front of a set of lenses of the AR smart glasses, and in a preferred embodiment, comprises a light transmittable part disposed on a larger area of the eye protection unit, and a pair of shading portions disposed on a smaller area of the eye protection unit such that they correspond to the pair of semitransparent display portions disposed on the AR smart glasses. The preferred embodiment of the present disclosure should not be construed as a limitation to the scope sought for protection.

According to one exemplary embodiment of the present disclosure, the eye protection unit comprises a set of regular lenses, a set of photochromic lenses, or a set of electrochromic liquid crystal lenses.

According to another exemplary embodiment of the present disclosure, an eye-protective shade for AR smart glasses is provided, including: a pair of AR smart glasses connected to a host or a smartphone used to transmit data, and a frame unit, wherein the frame unit is disposed with a pair of lenses, and each of the pair of lenses is disposed with a semitransparent display portion; an eye protection unit, which is a set of lenses disposed in front of the AR smart glasses, comprising a light transmittable part disposed on a larger area of the eye protection unit, wherein the light transmittable part is used to enable the peripheral retina to continuously contact sunlight, and a pair of shading portions capable of filtering light disposed on a smaller area of the eye protection unit such that they correspond to the pair of semitransparent display portions, wherein the pair of shading portions are made of translucent material and/or opaque material; and a reading system installed with teaching material selected from a group comprising language, science, math, geography, history, physics, chemistry, art, and music.

When using the present disclosure to read digital information, the eye protection unit is used to protect the user's eyeballs and the central retinal area (macula) from direct light radiation while the peripheral retina is continuously in contact with sunlight and the user can see the surroundings clearly. When using the present disclosure to read, the user's head and neck can move and rotate freely, so neck stiffness and shoulder pain can be avoided. In addition, by using the present disclosure, the user can read while walking instead of being in the sitting posture for very long, so as to avoid cardiovascular diseases and weakness of limbs, and to moderate visual fatigue, and so on.

To sum up, by using the present disclosure to read, a person's reading habits can be positively changed, and causes of deterioration of myopia and visual fatigue, including prolonged ciliary muscle contraction, prolonged convergence, and insufficient contact time with sunlight, can be effectively prevented. If the eye protection unit of the present disclosure incorporates convex lenses, it can further resolve the problem of relative peripheral hyperopia.

In addition, the present disclosure can achieve the advantages as follows.

1. The images from the screen of the AR smart glasses are actively projected onto the retina, and therefore the user sees the target screen without actively searching it. In addition, as the target screen can be presented at more than six meters, the ciliary muscle is in a state of relaxation, thereby moderating visual fatigue. Thus it is a revolutionary advancement for the ciliary muscle to be in a relaxed state even when near reading.

2. The convex lenses respectively disposed on the pair of shading portions can transform the relative peripheral hyperopia into the relative peripheral myopia to moderate the myopic deterioration. It has been proved that deterioration of myopia in schoolchildren can be successfully slowed down by orthokeratology lenses, which use the same mechanism.

3. By means of a pair of display portions disposed correspondingly on the eyeballs, the eyeballs are not in convergence, the medial rectus muscle is in a state of relaxation, and the intraocular pressure is moderated as the medial rectus muscle is not in contraction, thereby slowing down the myopic deterioration. It is also a revolutionary advancement for the eyeballs to not have to converge even during near-sighted work.

4. When using the present disclosure to read, the user's head and neck can move and rotate freely, so neck stiffness and shoulder pain can be avoided. Thus to solve the long-standing problem of shoulder and neck soreness and stiffness in close reading of human beings.

5. Users can read comfortably even during locomotion. Because the AR smart glasses can be securely worn, the target screen moves in sync with the eyeballs and thus the target image is stable to the user, even when travelling in a vehicle or while walking. Hence, usage of the current disclosure can moderate the problems of muscles, bones, joints, and cardiovascular diseases by allowing users to avoid the sitting posture for prolonged periods. Thus to solve the long-standing problem caused by sedentary in close reading of human beings.

6. Outdoor use: the eye protection unit provided by the present disclosure can protect the eyeballs and macula from direct light radiation when the user is reading, by use of the current disclosure, outdoors. As long as the weather condition permits, outdoor reading will become a pleasant thing. In addition, the field of view can reach 180 degrees, thereby improving the narrow field of view indoors so as to moderate visual fatigue. This gives human beings the freedom to choose indoor or outdoor places as a reading place. Thus to solve the limitation that human beings have been limited to use computers indoors for a long period of time.

7. Big target screen. The further the distance between the eyeballs and the target screen, the bigger the screen appears to the user. Take a 23° viewing angle as an example, when the distance between the eyeballs and the target screen is 10 meters, the screen appears as 160-inches, and when the distance is 20 meters, the screen appears as 320-inches. The big target screen substitutes for the small screens of books, computers, TV, mobile phones, and so on. The long distance viewing replaces the conventional manner of short distance reading. The dual screen replaces the single screen, and the image can be presented in a three-dimensional manner. Thus it moderates visual fatigue and promotes reading. Thus to solve the limitation of human beings who have been fixed in front of a table to read a relatively small screen for a long period of time.

8. Reading is not affected by vibration. When reading on moving vehicles, such as cars, trains, and airplanes, the AR smart glasses can move synchronously with the eyeballs, thereby enabling the target screen to remain stable relative to the user, hence avoiding visual fatigue. Thus to solve the long-standing problems of reading difficulty and eye fatigue of commuters.

9. Exposure to sunlight. A large light-transmittable area is disposed on the outer peripheral of the pair of shading portions, and this design enables the peripheral retina to contact sunlight. By contacting sunlight on average for two to three hours a day, the deterioration of myopia can be moderated.

10. The methods of educating and learning can be changed. The dual display screen of the AR smart glasses can present 2D and 3D effects, and 2D and 3D images and videos will gradually replace conventional textbooks. In addition, with the increasing ubiquity of e-books, the big target screen will replace the traditional pages of textbooks and provide novel ways of learning, thereby making learning more fun.

In order to further understand the techniques, means and effects of the present disclosure, the following detailed descriptions and appended drawings are hereby referred to, such that and through which the purposes, features and aspects of the present disclosure can be thoroughly and concretely appreciated; however, the appended drawings are merely provided for reference and illustration, without any intention to be used for limiting the present disclosure.

BRIEF DESCRIPTIONS OF THE DRAWINGS

The accompanying drawings are included to provide further understanding of the present disclosure and are incorporated in, and constitute a part of, this specification. The drawings illustrate exemplary embodiments of the present disclosure and, together with the descriptions, serve to explain the principles of the present disclosure.

DESCRIPTIONS OF THE EXEMPLARY EMBODIMENTS

Figure 1:
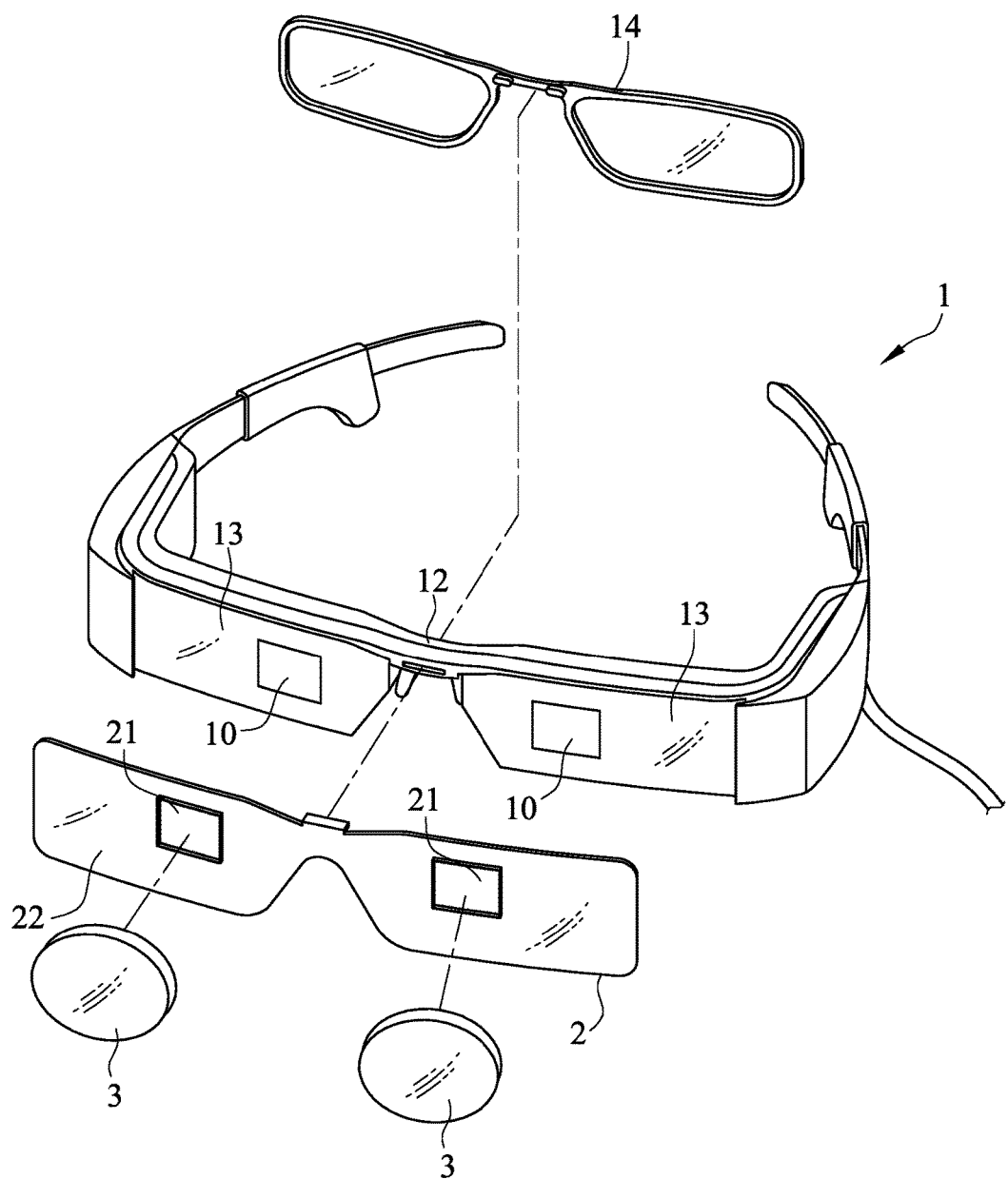
FIG. 1 is a three-dimensional diagram of the present disclosure.

Reference will now be made in detail to the exemplary embodiments of the present disclosure, examples which are illustrated in the accompanying drawings. Wherever possible, the same reference numbers are used in the drawings and the descriptions to refer to the same or like parts.

Please refer to FIG. 1 to FIG. 5 together. The present disclosure provides AR (Augmented Reality) smart glasses 1 which includes an eye protection unit 2 disposed in front of the AR smart glasses 1, wherein the eye protection unit 2 has a pair of shading portions 21 capable of filtering light, and the pair of shading portions 21 respectively correspond to a pair of semitransparent display portions 10 disposed on the AR smart glasses 1. In practice, the pair of shading portions 21 of the eye protection unit 2 can be made to suit the indoor/outdoor light intensity, thereby enabling the semitransparent display portions 10 of the AR smart glasses 1 to become partially transparent or totally opaque depending on the light intensity. In addition, a pair of convex lenses 3 are disposed corresponding to the pair of shading portions 21 to enable the light from the pair of semitransparent display portions 10 to focus on the macula, and the light passing through the periphery of the pair of semitransparent display portions 10 to focus in front of the retina at the same time. Here, the area of the pair of convex lenses 3 does not affect the user's vision, and the size of the area is not limited. The pair of convex lenses 3 may be lenses of any diopter used to change the relative peripheral hyperopia to the peripheral myopia. Alternatively, to the user with normal vision, the pair of convex lenses 3 may be replaced by plane lenses.

When the eye protection unit 2 uses plane lenses, the following advantages are achieved: the ciliary muscle is in a state of relaxation, the eyeballs are not in convergence, and the peripheral retina is continuously in contact with sunlight. In addition, when the eye protection unit 2 uses the convex lenses 3, it can change the focal length of the image in the peripheral retina from the rear of the retina to the front of the retina.

Hence, using the AR smart glasses 1 and the eye protection unit 2 to read the digital information can protect the eyeballs and the central retinal area (macula) from direct light radiation while the peripheral retina is continuously in contact with external light sources, and the user can see the surroundings clearly. Thus, when the light from the pair of semitransparent display portions 10 focuses on the macula, the light passing through the periphery of the pair of semitransparent display portions 10 focuses in front of the retina at the same time. However, if the refractive error is zero, the present disclosure can also enable the eye's extrinsic muscles to be in a natural state of relaxation, the ciliary muscle is not in contraction, effectively avoiding visual fatigue and development of myopia.

In addition, the AR smart glasses 1 include a host 11 or a smartphone used to transmit data, to which the AR smart glasses 1 are connected wirelessly or with cable, a user's prescription glasses 14, and a frame unit 12. Two sides of the frame 12 are respectively disposed with a lens 13, and each lens 13 is disposed with a semitransparent display portion 10. When using the AR smart glasses 1, the following advantages can be achieved, including: the eyeballs are not in convergence, the ciliary muscle is in a state of relaxation, the visual field is not shortened and can reach 180°, and the focal length of the image in the peripheral retina is changed from the rear of the retina to the front of the retina.

The eye protection unit 2 may be a set of lenses disposed in front of the set of lenses 13 of the AR smart glasses 1, and include a light transmittable part 22 disposed on a large area of the eye protection unit 2, wherein the light transmittable part 22 is used to enable the retina to continuously be in contact sunlight, and a pair of shading portions 21 disposed on a smaller area of the eye protection unit 2 such that they correspond to the pair of semitransparent display portions 10, wherein the pair of shading portions 21 are made of translucent material and/or opaque material.

The pair of convex lenses 3 are disposed corresponding to the pair of shading portions 21 to enable the light from the pair of semitransparent display portions 10 to focus on the macula, and the light passing through the periphery of the pair of semitransparent display portions 10 to focus in front of the retina at the same time. Here, the area of the pair of convex lenses 3 does not affect the user's vision and the size of the area is not limited. The pair of convex lenses 3 may be lenses of any diopter used to change the relative peripheral hyperopia to the peripheral myopia. Alternatively, to the user with normal vision, the pair of convex lenses 3 may be replaced by plane lenses. As to people suffering from presbyopia, the pair of convex lenses 3 are disposed on the eye protection unit 2 to moderate visual fatigue, and to see near objects clearly.

In a preferred embodiment, the eye protection unit 2 is integrally disposed on the AR smart glasses 1 (not shown), or detachably disposed on the AR smart glasses 1 (shown in the figures). In addition, the eye protection unit 2 includes a set of regular lenses, a set of photochromic lenses, or a set of electrochromic liquid crystal lenses.

A method of disposing the eye protection unit 2 on the AR smart glasses 1 is as follows:

1. In the manufacturing process, the pair of semitransparent display portions 10 are transformed into a pair of opaque display portions to form a pair of shading portions so as to form the eye protection unit 2. The pair of convex lenses 3 are disposed corresponding to the pair of shading portions 21 to enable the light from the pair of semitransparent display portions 10 to focus on the macula, and the light passing through the periphery of the pair of semitransparent display portions 10 to focus in front of the retina at the same time. Here, the area of the pair of convex lenses 3 does not affect the user's vision, and the size of the area is not limited. The pair of convex lenses 3 may be lenses of any diopter used to change the relative peripheral hyperopia to the peripheral myopia. Alternatively, to the user with normal vision, the pair of convex lenses 3 may be replaced by plane lenses.

Figure 2:
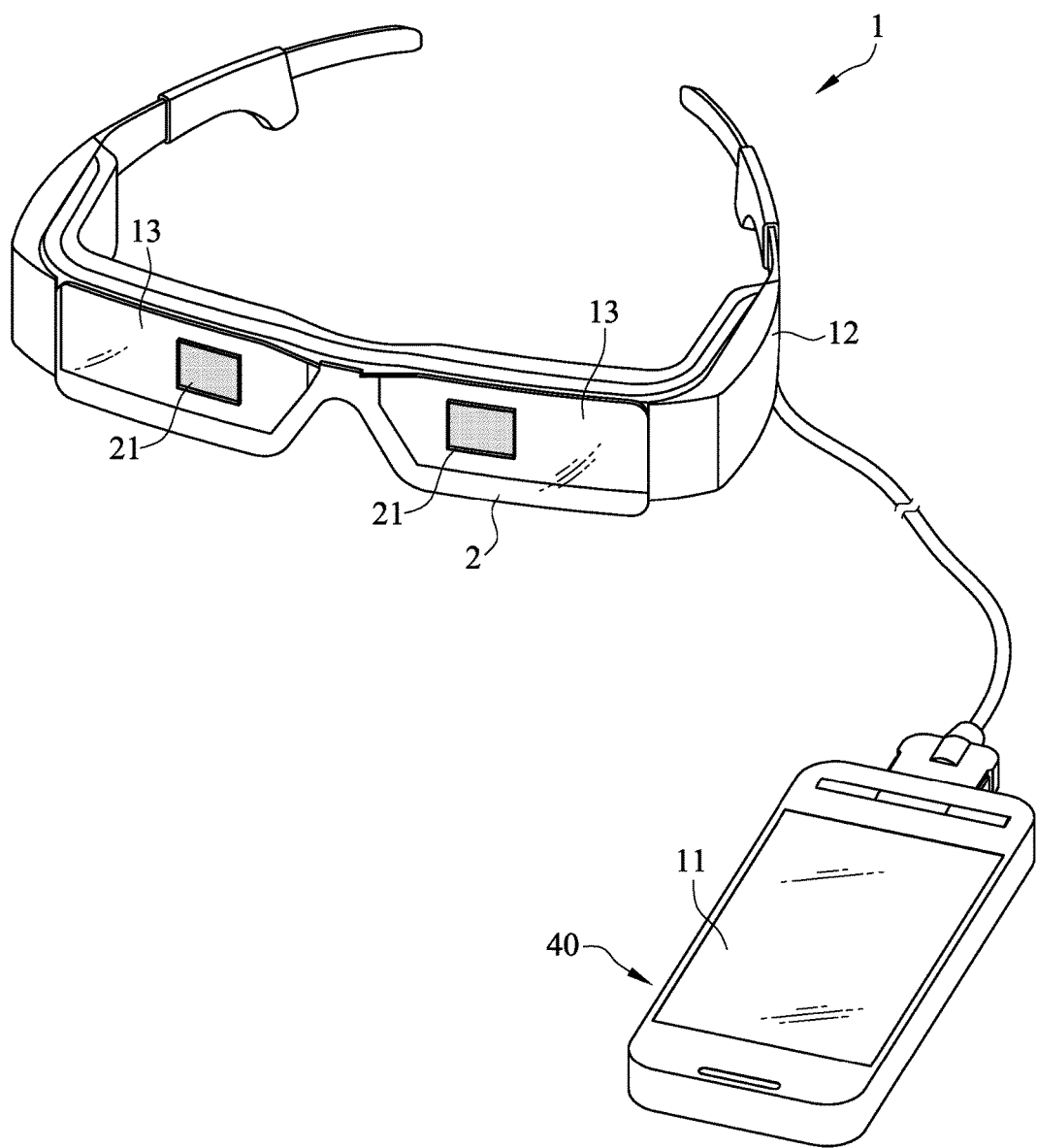
FIG. 2 is a three-dimensional diagram illustrating the present disclosure, disposed with plane lenses, connected to a host.
Figure 3:
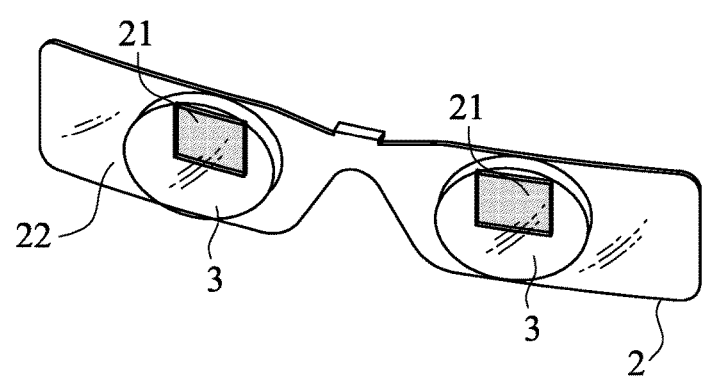
FIG. 3 is a three-dimensional diagram illustrating the eye protection unit of the present disclosure disposed with convex lenses.

2. A shading sheet can be disposed in front of each of the semitransparent display portions 10 to be used as the eye protection unit 2. In addition, the pair of convex lenses 3 are disposed corresponding to the pair of shading portions 21 to enable the light from the pair of semitransparent display portions 10 to focus on the macula, and the light passing through the periphery of the pair of semitransparent display portions 10 to focus in front of the retina at the same time. Here, the area of the pair of convex lenses 3 does not affect the user's vision and the size of the area is not limited. The pair of convex lenses 3 may be lenses of any diopter used to change the relative peripheral hyperopia to the peripheral myopia. Alternatively, to the user with normal vision, the pair of convex lenses 3 may be replaced by plane lenses (as shown in FIG. 2).

3. Please refer to FIG. 4. People suffering from myopia or presbyopia can use the pair of convex lenses 3. The pair of convex lenses 3 is integrally disposed with the eye protection unit 2 or disposed in front of the eye protection unit 2, but the present disclosure is not limited thereto. Thus the diopter of people suffering from myopia is not increased easily, and the people suffering from presbyopia can see images of objects clearly without the use of reading glasses.

Figure 6:
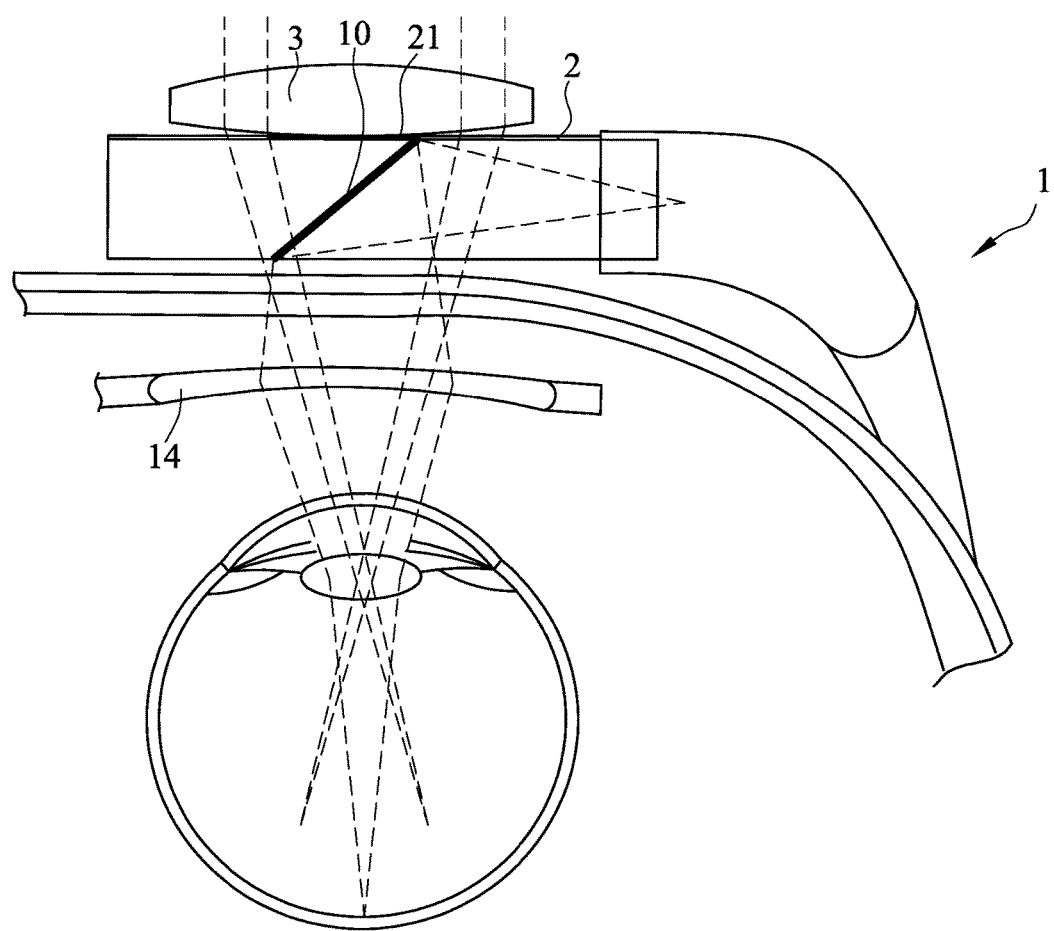
FIG. 6 is a diagram of the application of a convex lens of the present disclosure.

As shown in FIG. 6, the pair of semitransparent display portions 10 is disposed about 2 cm in front of the AR smart glasses 1 and can directly project the image onto the retina, and the retina receives the image without actively searching the target image. At this point in time, the ciliary muscle is not in contraction but in a state of relaxation, thereby moderating visual fatigue and deterioration of myopia.

Figure 7:
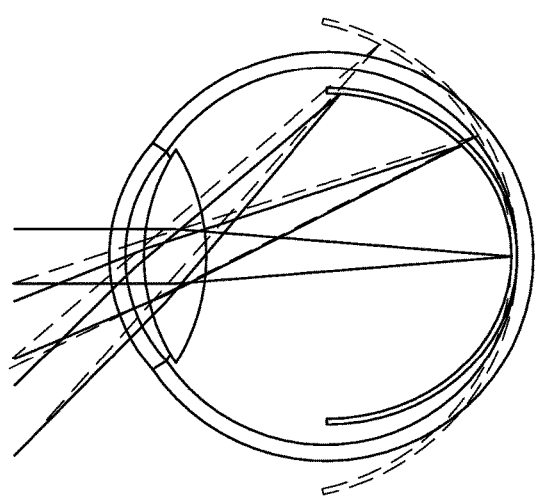
FIG. 7 is a diagram illustrating the present disclosure changes the focus from the rear of the retina to the front of the retina by using a convex lens.

Please refer to FIG. 6 and FIG. 7. When using the eye protection unit 2 and the pair of convex lenses 3 to read the digital information, the eyeballs and central retinal area (macula) can be protected from direct light radiation while the peripheral retina is continuously in contact with external light sources, and the user can see the surroundings clearly. Thus the light from the pair of semitransparent display portions 10 focuses on the macula, and the light passing through the periphery of the pair of semitransparent display portions 10 focuses in front of the retina at the same time. When using the pair of convex lenses 3, the light originally focusing behind the retina, as the dotted line shows in FIG. 7, is corrected to focus in front of the retina as the full line shows in FIG. 7. When the user uses the present disclosure to read, the pair of semitransparent display portions 10 enable the eyeballs to not have to converge so as to avoid high intraocular pressure caused by the medial rectus muscle contraction, thereby moderating deterioration of myopia.

When the user uses the present disclosure to read outdoors, the visual field can reach 180°. Under these circumstances, the eyeballs are in a comfortable state and the retina is adequately in contact with sunlight, which moderates the deterioration of myopia.

As the present disclosure has simple structure, it works easily with the AR smart glasses 1, thereby promoting their utility.

When the user travels by mass transit such as buses, trolleybuses, commuter rails, and so on, the target screen is not affected by movement of the vehicle because the AR smart glasses 1 can move synchronously with the user's eyeballs, thereby enabling the user to read the target screen clearly so as to avoid visual fatigue.

Figure 9:
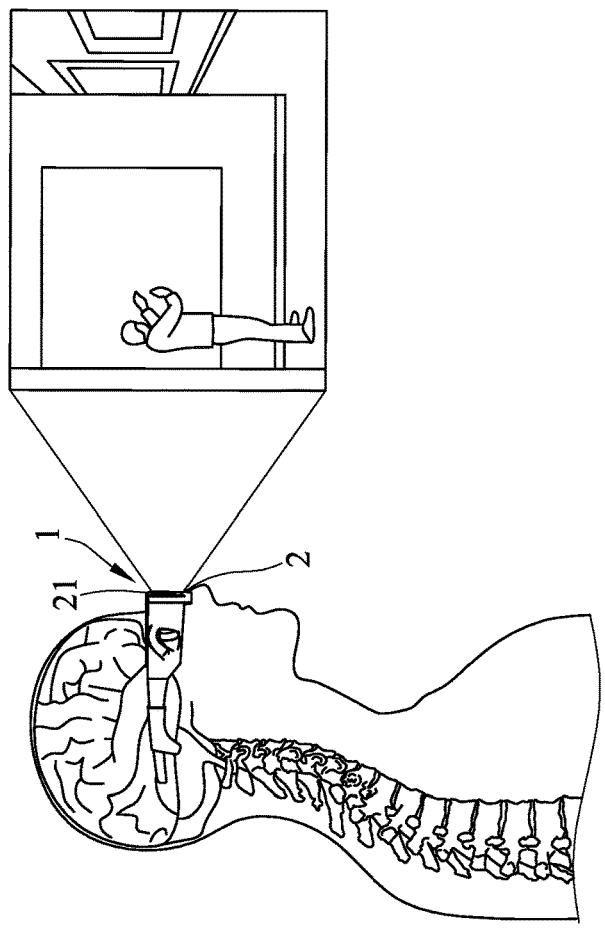
FIG. 9 is an illustration of the present disclosure under normal usage.
Figure 10:
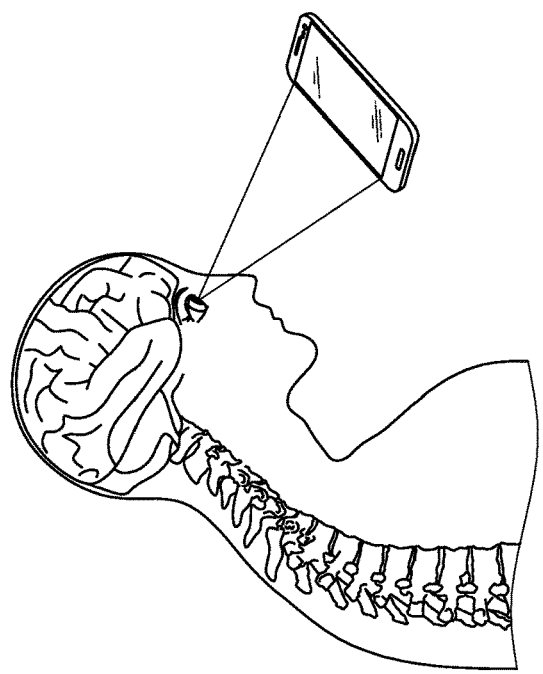
FIG. 10 is an illustration of the common head-down posture.

Please refer to FIG. 9. As shown in the figure, by using the present disclosure, the user can rotate and move his/her head and neck freely, avoiding neck stiffness and shoulder pain, as well as prolonged periods in the head-down position.

Figure 4:
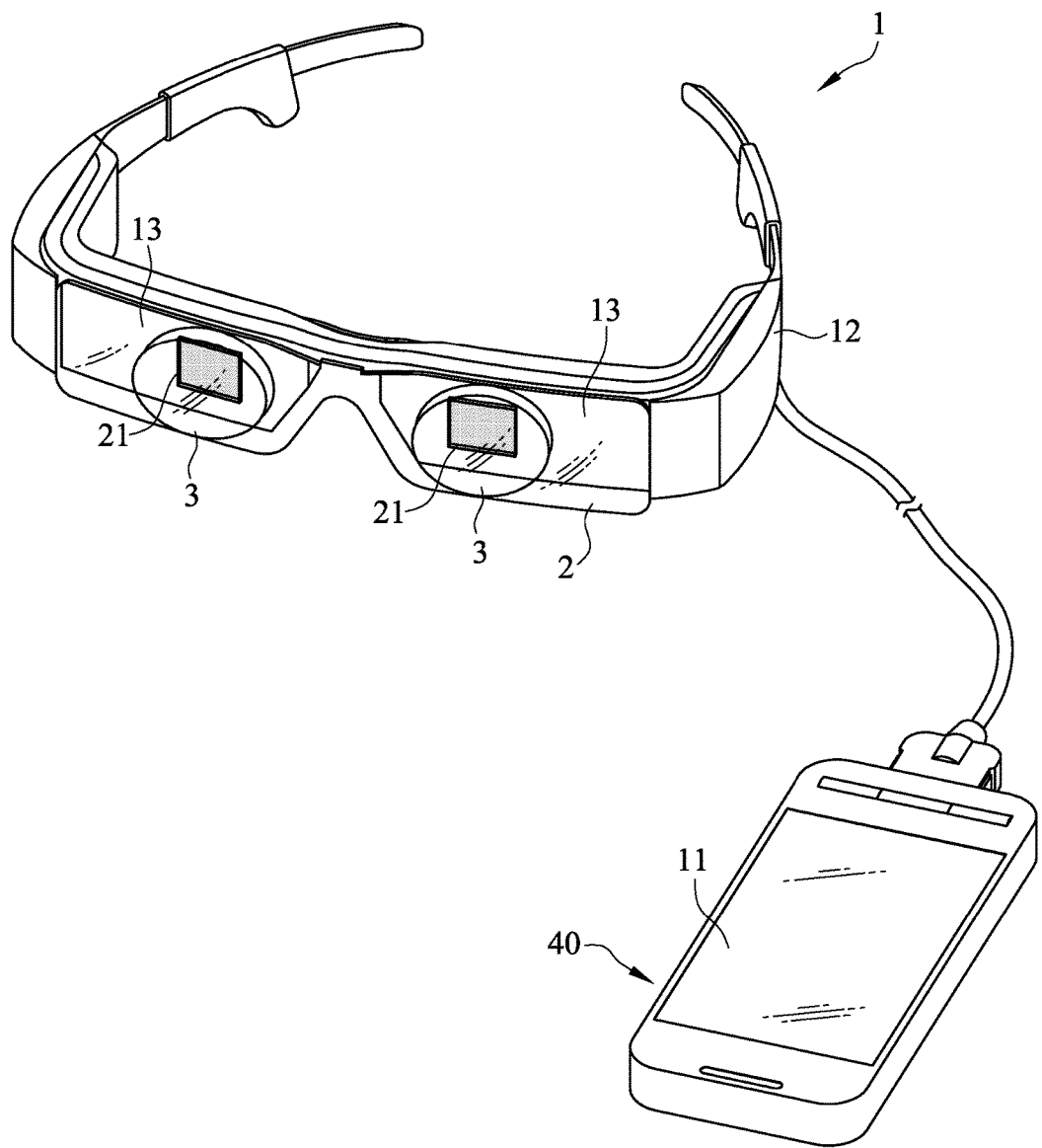
FIG. 4 is a three-dimensional diagram illustrating the present disclosure, disposed with convex lenses, connected to a host.
Figure 5:
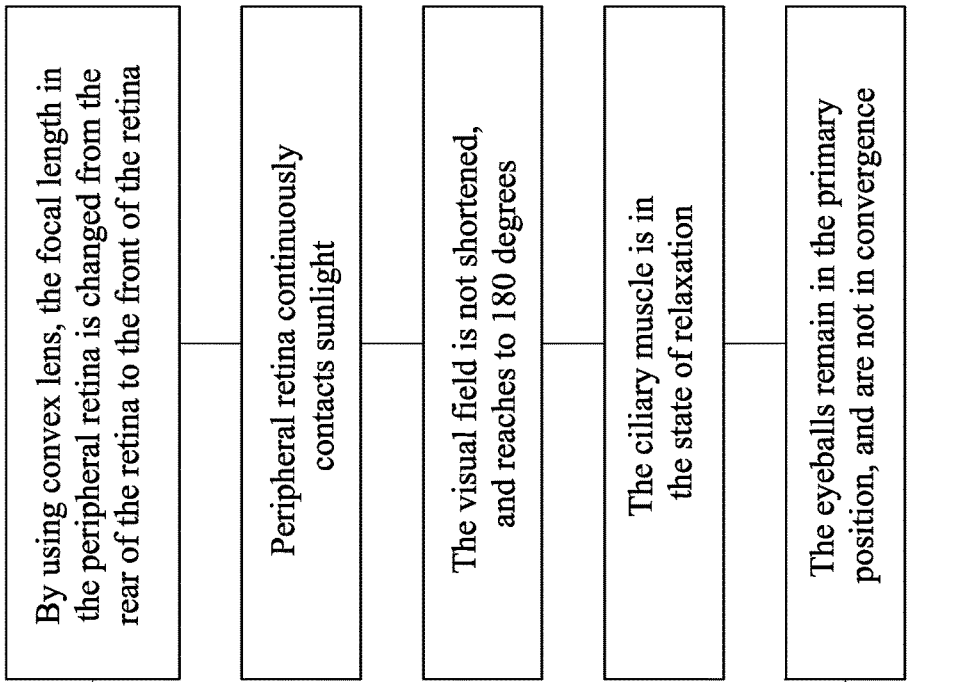
FIG. 5 is a diagram of the user using the present disclosure.
Figure 5:
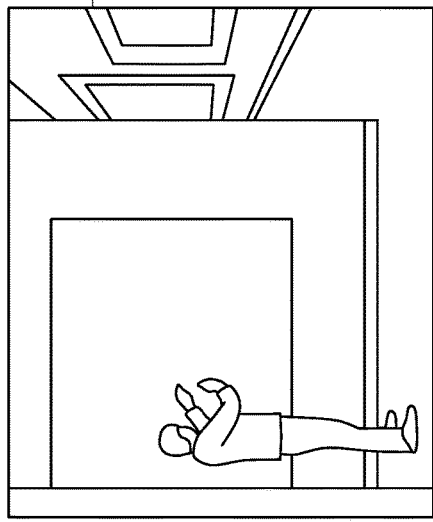
Figure 5:
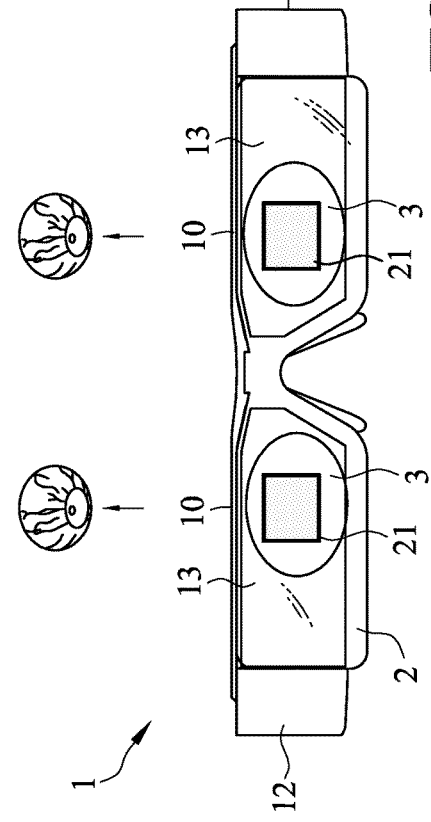
Figure 8:
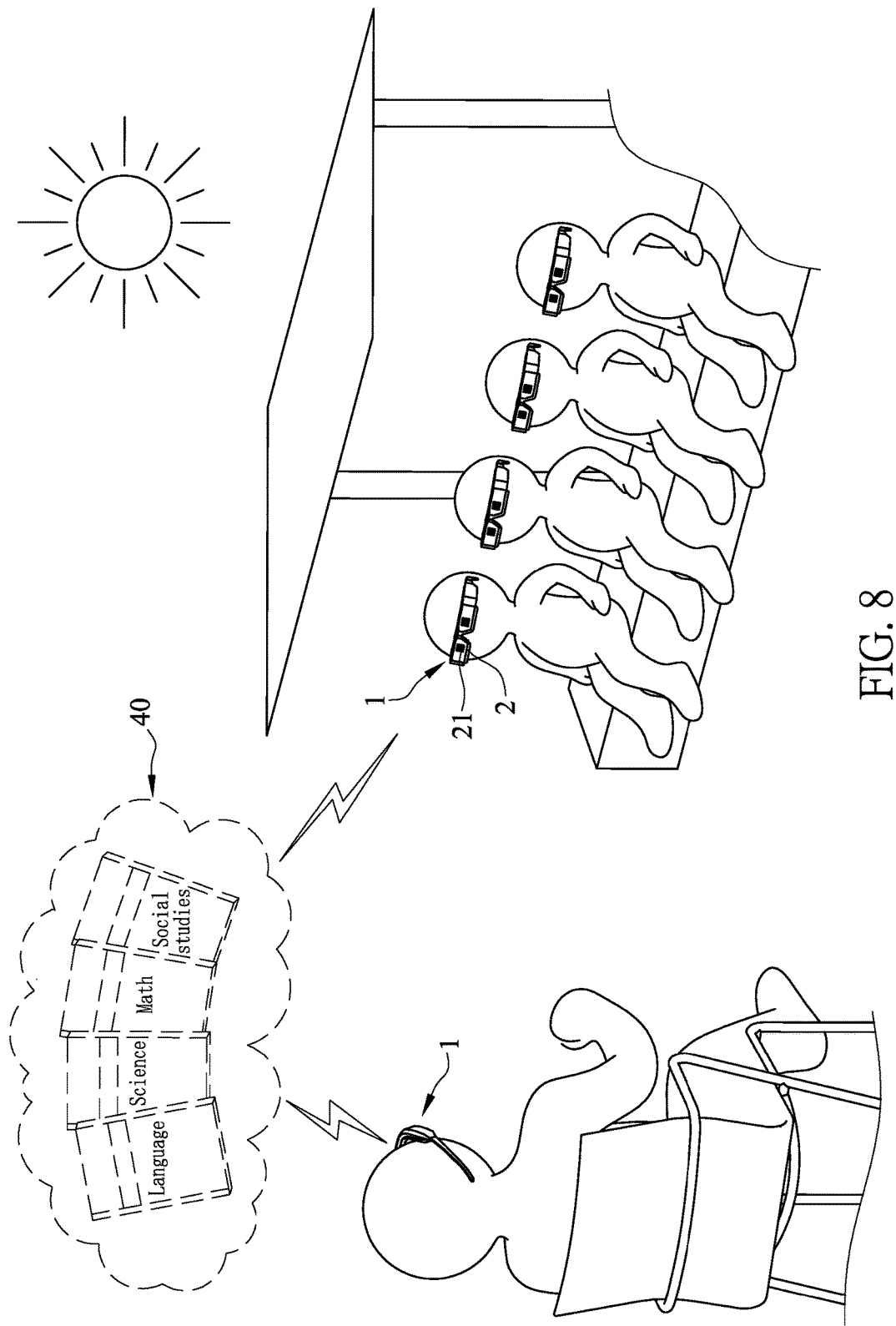
FIG. 8 is an illustration of the present disclosure applied to outdoor learning.

Please refer to FIG. 2, FIG. 4 and FIG. 8. In practice, a reading system 40 can be installed in the host 11 of the AR smart glasses 1 or it can work with cloud computing. The reading system 40 includes teaching material selected from a group comprising language, science, math, geography, history, physics, chemistry, art, and music, but is not limited thereto. By using the reading system 40, teachers and students are not limited to indoor classrooms, and the location of instruction can be anywhere including outdoor environments, which would be beneficial in prevention of nearsightedness.

In addition, when the present disclosure is used for instruction, conventional textbooks can be replaced by teaching materials using 2D or 3D pictures or films, thereby promoting interest in learning.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. An eye-protective shade for Augmented Reality (AR) smart glasses, comprising: an eye protection unit disposed in front of the AR smart glasses, wherein the eye protection unit is disposed with a pair of shading portions capable of filtering light, and the pair of the shading portions respectively correspond to a pair of semitransparent display portions disposed on the AR smart glasses, and the pair of shading portions are made of translucent material and/or opaque material; wherein the eye protection unit further comprises a light transmittable part disposed on an outer periphery of the shading portions to enable a peripheral retina to be continuously in contact with external light sources; and wherein an area of each of the pair of shading portions is disposed with a convex lens.

2. The eye-protective shade for the AR smart glasses according to claim 1, wherein the eye protection unit is made of a set of regular lenses, a set of photochromic lenses, or a set of eiectrochromic liquid crystal lenses.

3. The eye-protective shade for the AR smart glasses according to claim 1, wherein a shading sheet is disposed in front of each of the semitransparent display portions to form the shading portion.

4. The eye-protective shade for the AR smart glasses according to claim 1, wherein the pair of semitransparent display portions of the AR smart glasses are partially transformed into a pair of opaque display portions to form the pair of shading portions.

5. An eye-protective shade for Augmented Reality (AR) smart glasses, comprising: an eye protection unit disposed in front of the AR smart glasses, wherein the eye protection unit is disposed with a pair of shading portions capable of filtering light, and the pair of the shading portions respectively correspond to a pair of semitransparent display portions disposed on the AR smart glasses, and the pair of shading portions are made of translucent material and/or opaque material; wherein the eye protection unit further comprises a light transmittable part disposed on an outer periphery of the shading portions to enable a peripheral retina to be continuously in contact with external light sources; wherein an area of each of the pair of shading portions is disposed with a plane lens.

* * * * *